Dec. 20, 1966    R. H. FRYE    3,293,078
SEA WATER BATTERY AND A LOUVERED ANODE FOR USE THEREIN
Filed Feb. 28, 1964
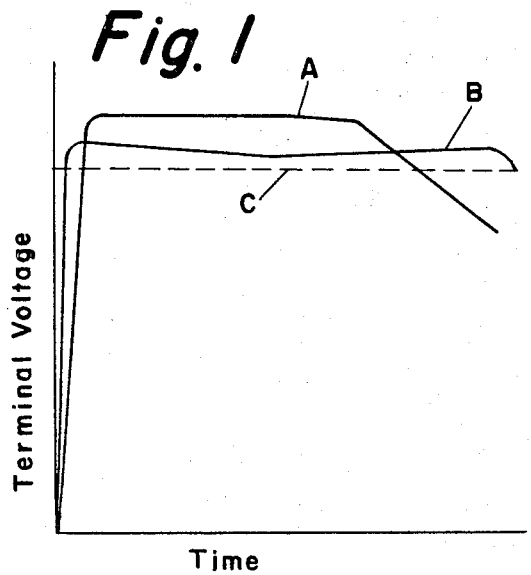
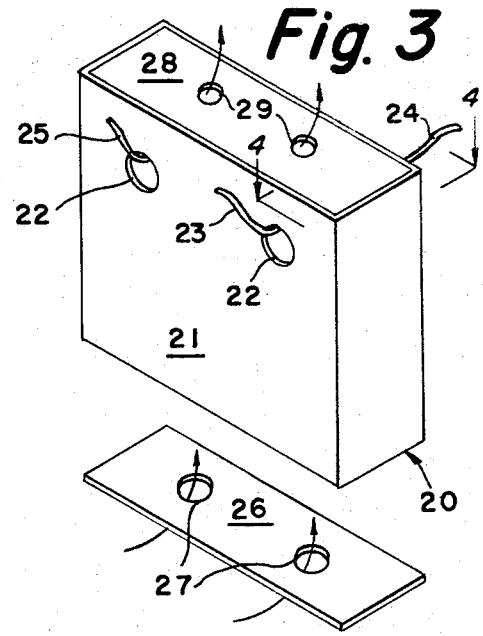
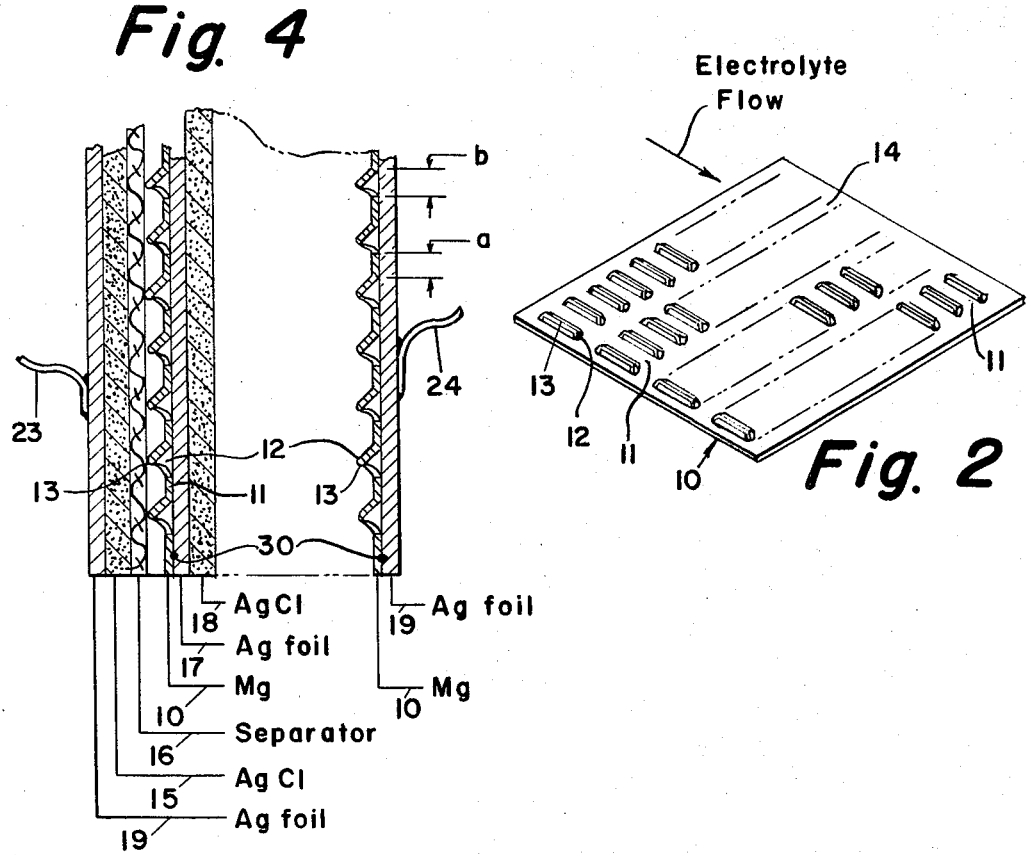

United States Patent Office 3,293,078
Patented Dec. 20, 1966

3,293,078
SEA WATER BATTERY AND A LOUVERED
ANODE FOR USE THEREIN
Raul H. Frye, Greenwich, Conn., assignor to The Electric
Storage Battery Company, a corporation of New Jersey
Filed Feb. 28, 1964, Ser. No. 348,090
7 Claims. (Cl. 136—83)

This invention relates to a sea water battery and an anode for use therein. In particular, the present invention relates to a louvered anode of magnesium or magnesium alloy which is particularly useful when employed in a sea water battery having a silver chloride cathode.

It is well known that a primary electric battery having a high power and energy output per unit weight and volume can be prepared using sea water or its equivalent as the battery electrolyte. Such a battery may employ silver chloride as the cathode active material and magnesium or a magnesium alloy as the anode active material. The battery is constructed in the form of a pile, that is the anode of one cell is electrically connected to the cathode of the adjacent cell. This type of primary battery is generally preserved in a dry state, i.e. no electrolyte, until it is to be used, at which time it is immersed in a suitable electrolyte. It is highly desirable that such batteries be capable of rapid activation, i.e. obtain operating voltage or potential rapidly when contacted with electrolyte. Since electrodes are closely spaced in primary batteries of this type, it is possible to achieve a high current density without having an excessive drop in terminal voltage even though a very dilute electrolyte is used.

One of the problems generally encountered in sea water batteries of this type is that there is a substantial decrease in the terminal voltage substantially prior to complete failure of the battery. This decrease in the terminal voltage is very undesirable because electronic devices powered by this type of battery are designed to operate at a certain voltage, and the decreasing terminal voltage may cause the electronic devices to cease operating prematurely.

Another problem encountered in sea water batteries is that the electrodes must be spaced or separated from one another in such a way as to permit the electrolyte to have ready access to the electrodes, and in addition, it is preferred to keep the electrodes as close together as possible to keep internal battery resistance to a minimum. One conventional method of accomplishing this in a magnesium-silver chloride sea water battery is to corrugate the silver chloride electrode. The corrugated silver chloride reacts with varying efficiency due to the variation in the distance between the corrugated electrode and the magnesium electrode, and ultimately the internal resistance becomes so great that the voltage drops below the minimum operative value and the battery fails. Unfortunately, this failure often occurs even though some of the silver chloride has not been reacted which substantially reduces the efficiency of the battery. Since silver chloride is an expensive material, it should be utilized as efficiently as possible.

It is an object of the present invention to provide a specially designed anode for use in a sea water battery.

Another object of this invention is to provide a sea water battery having prolonged terminal voltage stability during the operation of the battery.

Other objects, purposes and advantages of this invention will be apparent to those skilled in the art in view of the following description, and in particular, by reference to the drawings in which:

FIGURE 1 is a graph of terminal voltage vs. time comparing a sea water battery of this invention with a sea water battery having a flat magnesium anode;

FIGURE 2 is a front elevation of a louvered electrode made in accordance with this invention;

FIGURE 3 is a front elevation of an assembled sea water battery of this invention with the bottom of the battery container separated to illustrate the sea water inlet ports; and FIGURE 4 is an enlarged sectional view taken on the horizontal plane 4—4 of FIGURE 3 with a portion broken away and several battery elements omitted for clarity.

It has been discovered that a rapidly activated, sea water battery having prolonged terminal voltage stability can be manufactured by utilizing a louvered magnesium electrode in combination with a flat silver chloride electrode. The magnesium metal electrode is readily handled and may easily be louvered on a metal stamping machine. One of the principal advantages obtained by using a louvered magnesium anode in a sea water battery is prolonged stability of terminal voltage. This advantage is clearly demonstrated by the terminal voltage vs. time graph of FIGURE 1 wherein a sea water battery of this invention is compared to a standard sea water battery employing flat, unlouvered magnesium anodes. Curve A represents the standard sea water battery and Curve B represents a sea water battery having louvered magnesium anodes. Though the initial terminal voltage shown by Curve B is lower than the standard, it is apparent that the battery having the louvered magnesium anodes maintains a relatively stable terminal voltage for a substantially longer time than the standard sea water battery. Assuming that a terminal voltage represented by line C in FIGURE 1 is required to operate the electronic device being powered by the sea water battery, it is apparent that a battery having louvered magnesium electrodes is an effective power source for a greater time than a standard sea water battery having an equivalent amount of active material.

A sea water battery made in accordance with this invention has louvered anodes of magnesium or magnesium alloy, depending upon the application for which the battery is designed, and silver chloride cathodes separated from the anodes by means of an inert insulating material, such as for example a fused nylon net. The louvered magnesium anodes are chemically treated to prevent or resist storage humidity corrosion. The silver chloride cathodes are treated to reduce a surface layer to pure silver metal which is electrically connected to a silver foil collecting grid. The battery container has holes in the top and bottom which permit the sea water electrolyte to flow through the battery. The flow of the electrolyte through the battery flushes the reaction by-products from the battery and helps to control the temperature of the battery which affects the terminal voltage and the battery efficiency.

A preferred embodiment of a louvered electrode is illustrated in FIGURE 2. The electrode 10 comprises a web portion 11 located between the louvers 12. The louvers are separated into rows by the channels 14 which provide mechanical strength and help to equalize the electrolyte flow over the electrode surface during the operation of the battery. If the electrodes are relatively small, it is possible to have only one row of louvers rather than a plurality of rows as shown in FIGURE 2. The number of rows of louvers is generally dictated by the mechanical strength which is required.

In the operation of a sea water battery having louvered anodes, the louvers are placed facing the cathode of the same cell, and the edge 13 of the louvers is nearer to the cathode. The edge 13 reacts first and is the first portion of the anode to be consumed. As the sea water battery continues to operate and the louvers continue to be consumed, the ionic flow from the web portion 11 increases in proportion to the increased resistance between the remaining portion of the louvers 12 and the cathode. The increased ionic flow from the web portion tends to compensate for the increased internal battery resistance due to the increased distance between the cathode and the louvers, and thereby, the terminal voltage is maintained relatively stable.

In order to achieve the voltage stability as graphically illustrated in FIGURE 1, it has been discovered that the size of the louvers in proportion to the web portion and the distance which they extend from the web portion of the electrode are critical. The louvered portion and the web portion must be selected so as to provide a relatively constant ionic flow density between the louvered anode and the cathode. As previously stated, the edges 13 of the louvers react more rapidly than the web portion 11 and there is a much greater ionic flow from the louvers than from the web portion. As the louvers are consumed, the ionic flow from the louvers decreases and the ionic flow from the web portion increase sufficiently to offset the decrease in ionic flow from the louvers. It has been found that in order to achieve relatively constant ionic flow density, and thereby terminal voltage stability, the area of the web portion 11 must be approximately equal to the area of the louvers 12. Regarding each row of louvers as representing an area equal to 100 percent, the louvered or extended portion may range from 45 to 55 percent, and likewise, the web portion may range from 45 to 55 percent. Referring to FIGURE 4, the width of the web portion $a$ must be approximately equal to the width of the louver $b$. The louvers may extend from the web for a distance up to about twice the thickness of the anode sheet, though it is desirable to have the web portion of the anode as close to the cathode as possible in order to keep the internal battery resistance to a minimum.

The louvered electrodes of this invention may be prepared from pure magnesium metal or a magnesium alloy, though it is generally preferred to use a magnesium alloy. Examples of alloys which may be used are about 3% by weight of aluminum, 1% zinc and the balance magnesium; or 6% aluminum, 1% zinc and the balance magnesium. It is believed that the aluminum helps to prevent the retention on the anodes of insoluble magnesium salts which are formed during the operation of the battery. The magnesium electrodes used in sea water batteries are preferably as thin as is practicable on the basis of electrochemical and strength requirements, e.g. sheets from about 10 to about 80 mils thick have been used satisfactorily. In addition to magnesium, it is apparent that other anode materials such as aluminum and zinc may also be used.

Louvered magnesium electrodes made in accordance with this invention are particularly useful as anodes in primary batteries in combination with silver chloride cathodes. Such a system is capable of providing relatively high current densities even with dilute electrolytes, such as sea water. In the electrochemical system employing magnesium anodes, silver chloride cathodes and sea water electrolyte, the silver chloride is reduced to silver metal and the magnesium is oxidized to magnesium chloride. Since silver chloride is a substantially nonconductive material, the silver chloride cathodes must contact a current-collecting grid which is electrically conductive, such as silver foil or screen, and which is electrically connected to a thin layer of reduced silver on the silver chloride cathode.

In the preferred embodiment of sea water batteries made in accordance with this invention, the magnesium-silver chloride cells are assembled in a pile arrangement, i.e. the anode of one cell is electrically connected to the cathode of the adjacent cell. In the preferred embodiment, a metallic silver foil is used as the current collector for the silver chloride cathode, and it also functions as an electrical connection between the cathode and the anode of the adjacent cell. It has been found that the performance of the sea water batteries of this invention can be improved if the surface of the silver foil adjacent to the magnesium anode is given to electrically nonconductive, electrolyte resistant coating, such as a lacquer or resin base cement. No. 234 latex base contact cement made by Armstrong Cork Co. is particularly effective. It is believed that this coating helps to prevent local electrochemical activity between the magnesium anode louvers and the silver foil which are separated only by electrolyte. When the silver foil is coated as described above, it may be electrically connected to the magnesium anodes by spot welding, or some other type of electrical connection near the edges of the anodes and the foil, with great care being taken to prevent the electrolyte from having access to this electrical connection.

Also present in the battery are separators which separate the anode and cathode, i.e. electrically insulate them, and also help to provide passages for the free circulation of electrolyte. One of the advantages achieved by using louvered magnesium anodes is that the louvers help to space the anode from the cathode of each cell which permits the use of very thin separators. The thin separators help to keep the internal battery resistance to a minimum. The separators may be prepared from any sufficiently strong, durable inert insulating material. It is generally preferred to use nylon separators in the form of fused nylon net, nylon screen or nylon buttons.

In order to provide rapid activation of sea water primary batteries upon immersion in the electrolyte, it is necessary that all anode surface contamination be removed. This is a difficult task, for the batteries are usually stored for long periods of time prior to activation. The batteries are often stored in warm, humid climates which facilitates atmospheric corrosion of the magnesium anodes. Therefore, the louvered magnesium anodes are generally subjected to degreasing and subsequent chromating or other chemical treatment to prevent or retard atmospheric corrosion and thereby insure rapid activation.

After the magnesium or magnesium alloy sheets are stamped to provide louvers therein, the sheets are then dipped in a caustic solution which degreases the sheet by saponification. Then the sheets are washed until the wash solution in neutral, after which they are given a chromating treatment. A typical chromating solution may comprise an aqueous solution containing 8 ounces of $MgSO_4 \cdot 7H_2O$ and 5.3 ounces of $Na_2Cr_2O_7 \cdot 2H_2O$ per gallon of solution, adjusted to a pH of 3 by means of sulfuric acid. The louvered magnesium sheet may be immersed in the chromating bath for several minutes, sufficient to form a magnesium chromate surface on the electrode which provides some degree of humidity resistance. Primary sea water batteries employing louvered magnesium anodes prepared in accordance with this invention may be activated, i.e. attain full terminal voltage, within about 25 seconds at 31° F. and within about one half second at 86° F.

A more detailed description of a primary sea water battery prepared in accordance with this invention may be obtained by referring to FIGURES 3 and 4. FIG- URE 3 illustrates a preferred embodiment of a sea water battery of this invention. The 9 cell sea water battery 20 has a container 21 in which there are holes 22 on both sides through which wires 23, 24 and 25 project. The terminal lead wires 23 and 24 are electrically connected to the terminal electrodes (one anode and one cathode) in the battery as clearly shown in FIGURE 4. The wire 25 is electrically connected to the silver foil sheet attached to the mid cell (i.e. the 5th cell) cathode. If desired, the electrical connection to the mid cell may be omitted. The bottom piece 26 of the battery container has two relatively large holes 27 which serve as inlet ports for the sea water electrolyte as indicated by the arrows. The top piece 28 of the battery container also has two holes 29 which may be smaller than the inlet port holes 27. The holes 29 function as electrolyte outlet ports as indicated by the arrows. The container and bottom and top pieces may be made from any suitable electrolyte-resistant material such as a thermoplastic resin.

In FIGURE 4, a portion of the primary sea water battery illustrated in FIGURE 3 is shown in an enlarged sectional view with several of the cells omitted for clarity. Terminal lead wires 23 and 24 are electrically attached to silver foil sheets 19. The lead wires 23 and 24 may be attached to the silver foil sheet 19 by spot welding. The silver chloride cathode 15 is electrically insulated from the louvered magnesium anode 10 by means of a fused nylon net separator 16. It should be noted that the louvers 12 of the magnesium anode 10 are pointed toward the silver chloride cathode 15 and are placed in such a manner that the sea water electrolyte or its equivalent flowing upward through the battery has access to the back side of the louvers 12. The louver edge 13 which is relatively near the silver chloride cathode 15 is reacted and consumed first. The cells are under slight compression, and as the louvers 12 are consumed, the anode web portion 11 is pressed closer to the cathode 15 and is reacted inversely proportional to the resistance of the several electrical paths on the louver and the web as established by the ion flow in the electrolyte.

The silver foil 19, silver chloride cathode 15, separator 16 and louvered magnesium anode 10 comprise one cell of the battery. This cell is electrically connected to the adjacent cell in a pile arrangement by means of a silver foil sheet 17 which electrically connects the louvered magnesium anode 10 to the silver chloride cathode 18 of the adjacent cell. In the event that the surface of the silver foil sheet 17 adjacent to the magnesium anode 10 is coated with an electricaly nonconductive, electrolyte resistant coating, which is particularly preferred, the foil 17 and the anode 10 may be electrically connected by one or more spot welds 30 near the edges of the foil and anode. This assembly is continued whereby a plurality of cells are electrically connected in series to comprise a sea water primary battery. At the other end of the battery, terminal lead wire 24 is electrically connected to the louvered magnesium anode 10 by means of the silver foil sheet 19.

The following example illustrates the performance of a 10 cell sea water battery which employs louvered magnesium anodes in accordance with this invention:

*Example 1*

A 10 cell sea water battery having louvered magnesium anodes in accordance with this invention was assembled and tested in cold sea water electrolyte having a temperature of about 31° F. The louvered anodes were prepared from a magnesium alloy containing about 3% by weight of aluminum, 1% zinc and the balance magnesium. The cathodes were flat and prepared from silver chloride. The separators were nets of nylon threads fused at their junction points and having an average thread diameter of 10 mils. The louvered anodes were prepared from sheets 20 mils thick, had 4 rows of louvers with each row containing 20 louvers, and each louver extends about 37 mils.

This battery was compared to a conventional 10 cell sea water battery having flat magnesium anodes and corrugated silver chloride cathodes. Both batteries had an equivalent amount of active material. The cold water test yielded the following results:

| Time (min.) | Terminal Voltage (volts) | |
|---|---|---|
| | Louvered Anode Battery | Conventional Battery |
| 0.25 | 12.226 | 11.616 |
| 0.5 | 12.366 | 11.887 |
| 0.75 | 12.417 | 12.135 |
| 1 | 12.638 | 12.550 |
| 1.5 | 12.768 | 12.906 |
| 2 | 12.810 | 12.988 |
| 2.5 | 12.820 | 13.029 |
| 3 | 12.819 | 13.043 |
| 10 | 12.655 | 13.045 |
| 20 | 12.605 | 13.048 |
| 30 | 12.666 | 13.049 |
| 40 | 12.708 | 13.217 |
| 50 | 12.766 | 13.274 |
| 60 | 12.915 | 13.108 |
| 61 | 12.870 | 13.086 |
| 72.5 | ---------- | 12.50 |
| 88.5 | 12.50 | ---------- |

These results clearly indicate that the sea water battery having the louvered anodes was activated more rapidly and had a prolonged terminal voltage stability.

The louvered anode construction of this invention has been described as applicable to magnesium anodes when used in a sea water electrolyte. It is obvious that the cells and batteries of this invention will operate in electrolyte other than sea water. For example, any aqueous solution of sodium chloride or other alkali or alkaline earth metal chloride such as a 3 percent aqueous solution, may be employed, and as used in this specification and the claims which follow, the term "sea water electrolyte" is intended to include such electrolytes.

Having completely described this invention, what is claimed is:

1. A sea water battery cell comprising a silver chloride cathode, a separator, a sea water electrolyte, and a louvered anode having a plurality of louvers extending toward the cathode, the area of the louvers being approximately equal to the area of the web portion of the electrode, said louvers extending from the web portion a distance not exceeding about twice the thickness of the electrode, and said louvered anode being prepared from electrochemically active material consisting essentially of magnesium.

2. A sea water battery cell in accordance with claim 1 in which said louvered anode is a magnesium alloy consisting essentially of magnesium and containing minor amounts of aluminum and zinc.

3. A sea water battery having a plurality of cells electrically connected in series comprising a silver chloride cathode, a nylon separator, a sea water electrolyte, and a louvered anode having a plurality of louvers extending toward the cathode of the same cell, the area of the louvers being approximately equal to the area of the web portion of the electrode, said louvers extending from the web portion a distance not exceeding about twice the thickness of the electrode, each of said louvered anodes being electrically connected to the cathode of the adjacent cell by means of a sheet of silver foil placed between said anode and said cathode, and said louvered anodes being prepared from an electrochemically active material consisting essentially of magnesium.

4. A sea water battery in accordance with claim 3 in which the sheets of silver foil placed between adjacent anodes and cathodes are coated with an electrically nonconductive, electrolyte resistant coating on the surface adjacent to the anode.

5. A sea water battery in accordance with claim 4 in which the louvered anodes consist essentially of magnesium and contain minor amounts of aluminum and zinc.

6. A sea water battery in accordance with claim 5 in which the anodes consist essentially of about 3% by weight of aluminum, about 1% by weight of zinc and the balance is magnesium.

7. A sea water battery in accordance with claim 5 in which the anodes consist essentially of about 6% by weight of aluminum, about 1% by weight of zinc and the balance is magnesium.

References Cited by the Examiner
UNITED STATES PATENTS

| | | | |
|---|---|---|---|
| 2,684,396 | 7/1954 | Barrett | 136—50 X |
| 3,007,993 | 11/1961 | Haring | 136—100 |
| 3,129,118 | 4/1964 | Wilke et al. | 136—100 |

ALLEN B. CURTIS, *Primary Examiner.*

WINSTON A. DOUGLAS, B. J. OHLENDORF,
*Assistant Examiners.*